(12) United States Patent
Horn et al.

(10) Patent No.: US 8,517,401 B1
(45) Date of Patent: Aug. 27, 2013

(54) TRAILER MOVEMENT ASSISTING DEVICE

(76) Inventors: Frank A. Horn, Hastings, MI (US);
Marcia L. Horn, Hastings, MI (US)

( * ) Notice: Subject to any disclaimer, the term of this patent is extended or adjusted under 35 U.S.C. 154(b) by 110 days.

(21) Appl. No.: 13/227,941

(22) Filed: Sep. 8, 2011

(51) Int. Cl.
*B62B 1/00* (2006.01)
(52) U.S. Cl.
USPC .................. 280/47.15; 280/476.1; 280/490.1
(58) Field of Classification Search
USPC ................ 280/47.15, 32, 402, 47.131, 476.1, 280/47.27, 47.18, 47.28, 490.1, 47.24; 254/131, 254/812
See application file for complete search history.

(56) References Cited

U.S. PATENT DOCUMENTS

| | | | | |
|---|---|---|---|---|
| 4,482,182 A | * | 11/1984 | Mortensen | 254/131 |
| 4,811,988 A | * | 3/1989 | Immel | 298/2 |
| D309,818 S | | 8/1990 | Bink | |
| 5,228,651 A | | 7/1993 | Warner | |
| 5,860,485 A | * | 1/1999 | Ebbenga | 280/33.991 |
| 5,971,360 A | * | 10/1999 | Sinsley | 254/8 B |
| 6,053,477 A | | 4/2000 | Price | |
| 6,059,512 A | * | 5/2000 | Kielinski | 280/47.18 |
| 6,450,756 B1 | | 9/2002 | Stahancyk et al. | |
| 6,474,625 B2 | * | 11/2002 | Bevre | 254/131 |
| 6,520,482 B1 | * | 2/2003 | Bigham | 254/131 |
| 6,676,111 B2 | * | 1/2004 | Bigham | 254/131 |
| 6,820,940 B2 | * | 11/2004 | Gonzalez | 298/2 |
| 7,104,554 B2 | * | 9/2006 | Perras | 280/47.27 |
| 7,111,444 B1 | | 9/2006 | Morris et al. | |
| 7,350,790 B1 | * | 4/2008 | Wilson | 280/47.131 |
| 7,544,035 B1 | * | 6/2009 | Friedrich | 254/131 |
| 7,556,466 B2 | | 7/2009 | Dufty | |
| 7,845,670 B2 | * | 12/2010 | Oberg | 280/476.1 |
| 8,336,900 B2 | * | 12/2012 | Perry | 280/402 |
| 2004/0124404 A1 | | 7/2004 | Goldie | |

* cited by examiner

*Primary Examiner* — Hau Phan

(57) ABSTRACT

A trailer movement assisting device includes a base that has a first end and a second end, an upper edge and a lower edge. A pair of lateral supports is attached to the base adjacent to the first end. Each of the lateral supports has one of a pair of rear wheels attached thereto. Each of a pair of front wheels is attached to the base adjacent to the second end. A leverage bar is attached to the base adjacent to the first end. The leverage bar has an upper end and the leverage bar is angled away from the second end. A post is attached to the base adjacent to the second end. The post is angled toward the first end. A trailer engagement member extends upwardly from the post and is configured to engage a trailer to lift the trailer.

8 Claims, 6 Drawing Sheets

TRAILER MOVEMENT ASSISTING DEVICE

BACKGROUND OF THE DISCLOSURE

Field of the Disclosure

The disclosure relates to trailer moving and lifting members and more particularly pertains to a new trailer moving and lifting member for assisting a person in lifting or moving a trailer.

SUMMARY OF THE DISCLOSURE

An embodiment of the disclosure meets the needs presented above by generally comprising a base that has a first end, a second end, an upper edge and a lower edge. A pair of lateral supports is attached to the base adjacent to the first end. The lateral supports extend laterally away from the base in opposite directions with respect to each other. Each of the lateral supports has one of a pair of rear wheels attached thereto. Each of a pair of front wheels is attached to the base adjacent to the second end and is positioned on opposite sides of the base with respect to each to each other. A leverage bar is attached to the base adjacent to the first end and extends upwardly above the upper edge. The leverage bar has an upper end positioned opposite of the base. The leverage bar is angled away from the second end. A grip is attached to the leverage bar adjacent to the upper end. A post is attached to the base adjacent to the second end and extends upwardly therefrom. The post is angled toward the first end. A trailer engagement member extends upwardly from the post and is configured to engage a trailer. The trailer engagement member has a top end that is positionable at an adjustable height with respect to the base. The upper end is lowered to engage the trailer engagement member with a trailer to lift the trailer when the rear and front wheels are abutted with a ground surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
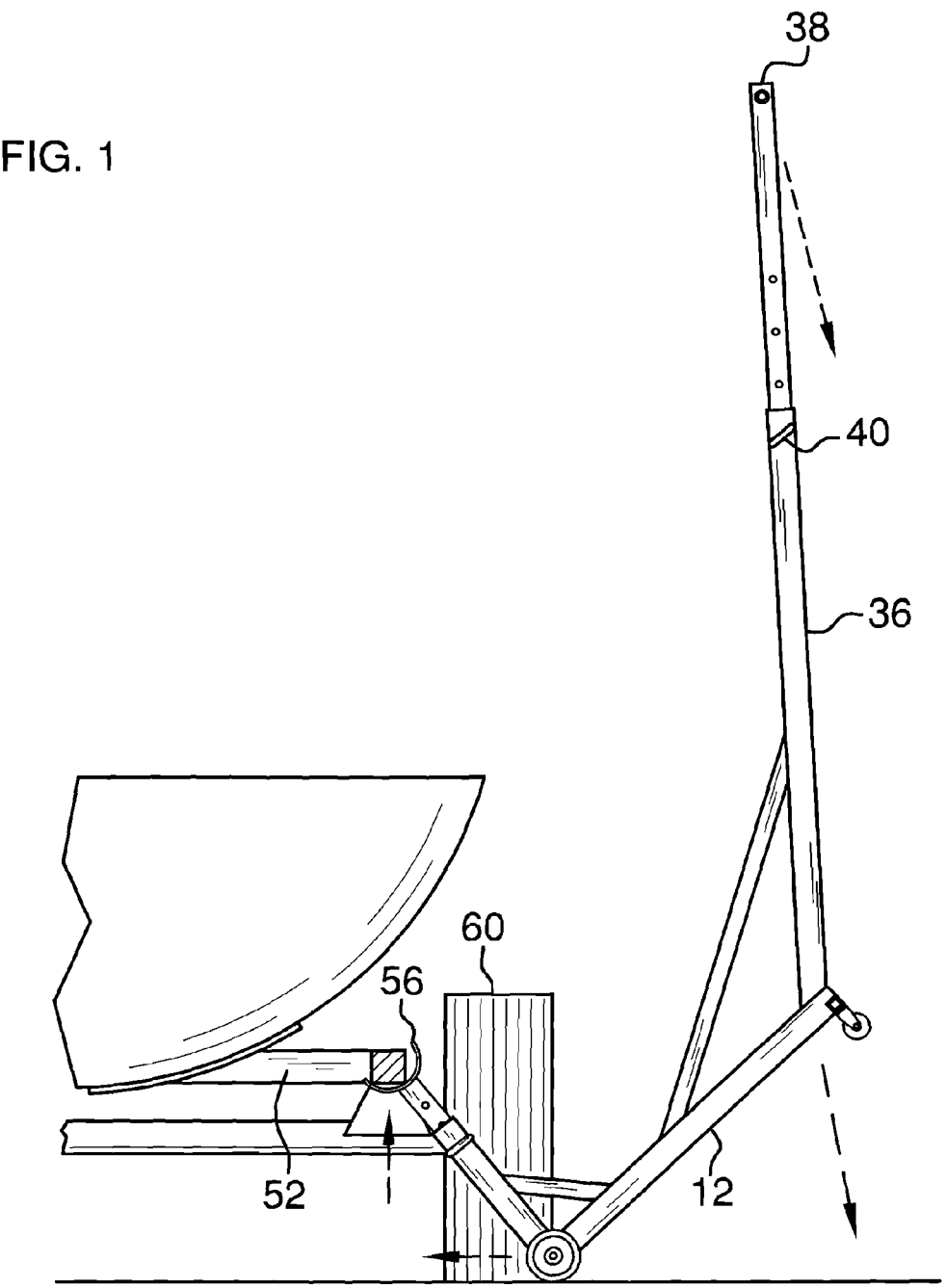
FIG. 1 is a side view of a trailer movement assisting device according to an embodiment of the disclosure.

With reference now to the drawings, and in particular to FIGS. 1 through 6 thereof, a new trailer moving and lifting member embodying the principles and concepts of an embodiment of the disclosure and generally designated by the reference numeral 10 will be described.

As best illustrated in FIGS. 1 through 6, the trailer movement assisting device 10 generally comprises a base 12 that has a first end 14, a second end 16, an upper edge 18 and a lower edge 20. The base 12 has a length from the first end 14 to the second end 16 between 26 inches and 38 inches. A pair of lateral supports 28 is attached to the base 12 adjacent to the first end 14. The lateral supports 28 extend laterally away from the base 12 in opposite directions with respect to each other. A pair of rear wheels 30 is provided. Each of the lateral supports 28 has one of the rear wheels 30 attached thereto. Each of the rear wheels 30 is coupled to an associated one of the lateral supports 28 by swivels 32 so that axis of rotation of the rear wheels 30 pivots with respect to the base 12. A pair of front wheels 34 is also provided. Each of the front wheels 34 is attached to the base 12 adjacent to the second end 16 and is positioned on opposite sides of the base 12 with respect to each to each other. The rear wheels 30 have an axis of rotation oriented perpendicular to a longitudinal axis of the base 12 extending through the first 14 and second 16 ends.

A leverage bar 36 is attached to the base 12 adjacent to the first end 14 and extends upwardly above the upper edge 18. The leverage bar 36 has an upper end 38 positioned opposite of the base 12. The leverage bar 36 is angled away from the second end 16 of the base 12 such that an angle between the upper edge 18 and the leverage bar 36 is between 130° and 140°. The leverage bar 36 is telescopic so that a length from the upper end 38 to the base 12 is adjustable and may be locked in place with a pin 40. The leverage bar 36 extends away from the base 12 a distance of at least 48 inches. A grip 42 is attached to the leverage bar 36 adjacent to the upper end 38. A bar brace 44 is attached to and extends between the leverage bar 36 and the base 12.

A post 46 is attached to the base 12 adjacent to the second end 16 and extends upwardly therefrom. The post 46 is angled toward the first end 14 so that an angle between the upper edge 18 and the post 46 is between 70° and 80°. A post brace 48 is attached to and extends between the base 12 and the post 46. The post brace 48 may be angled away from the post 46 as it extends away from post 46 to the base 12.

Figure 2:
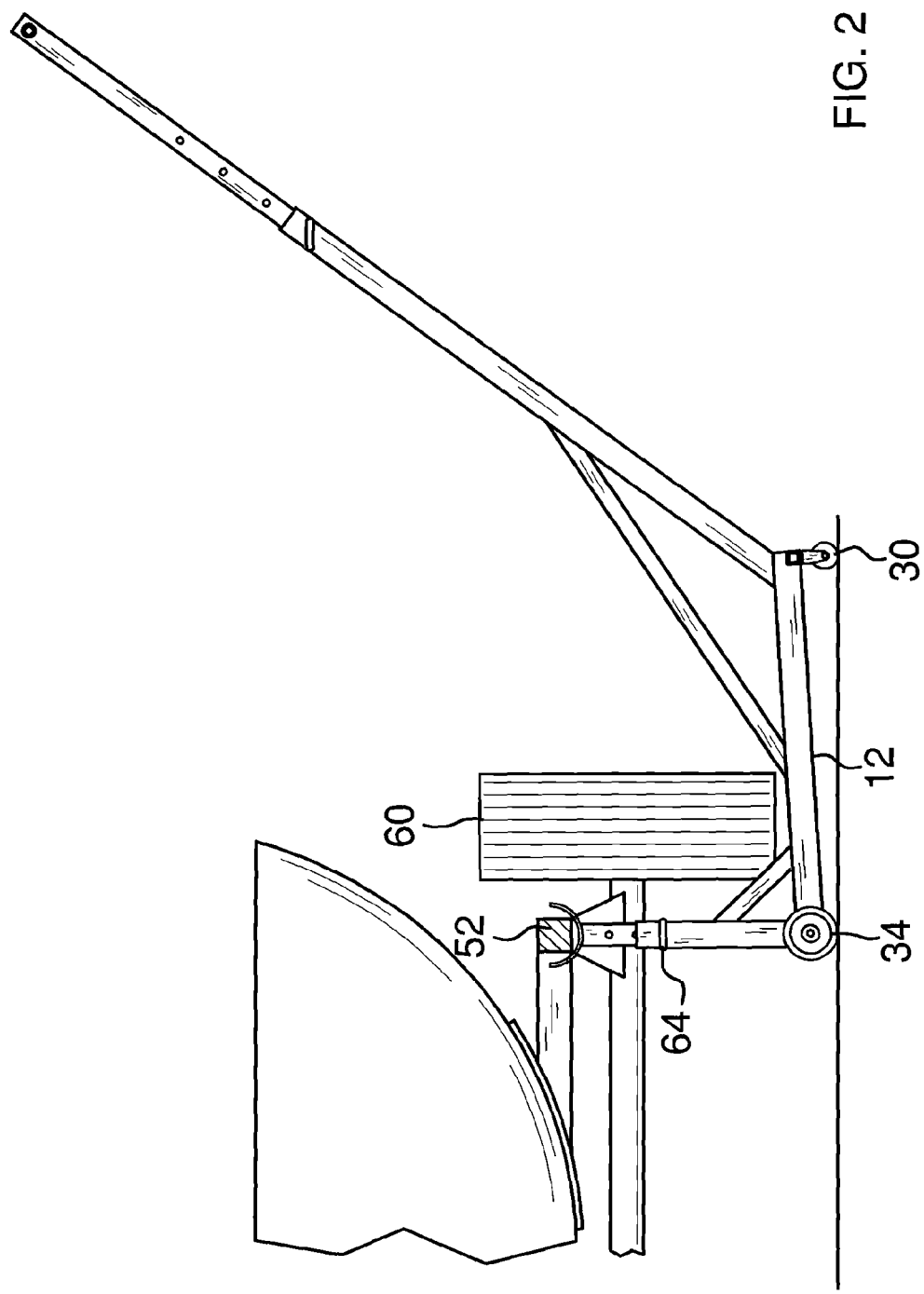
FIG. 2 is a side view of an embodiment of the disclosure.
Figure 3:
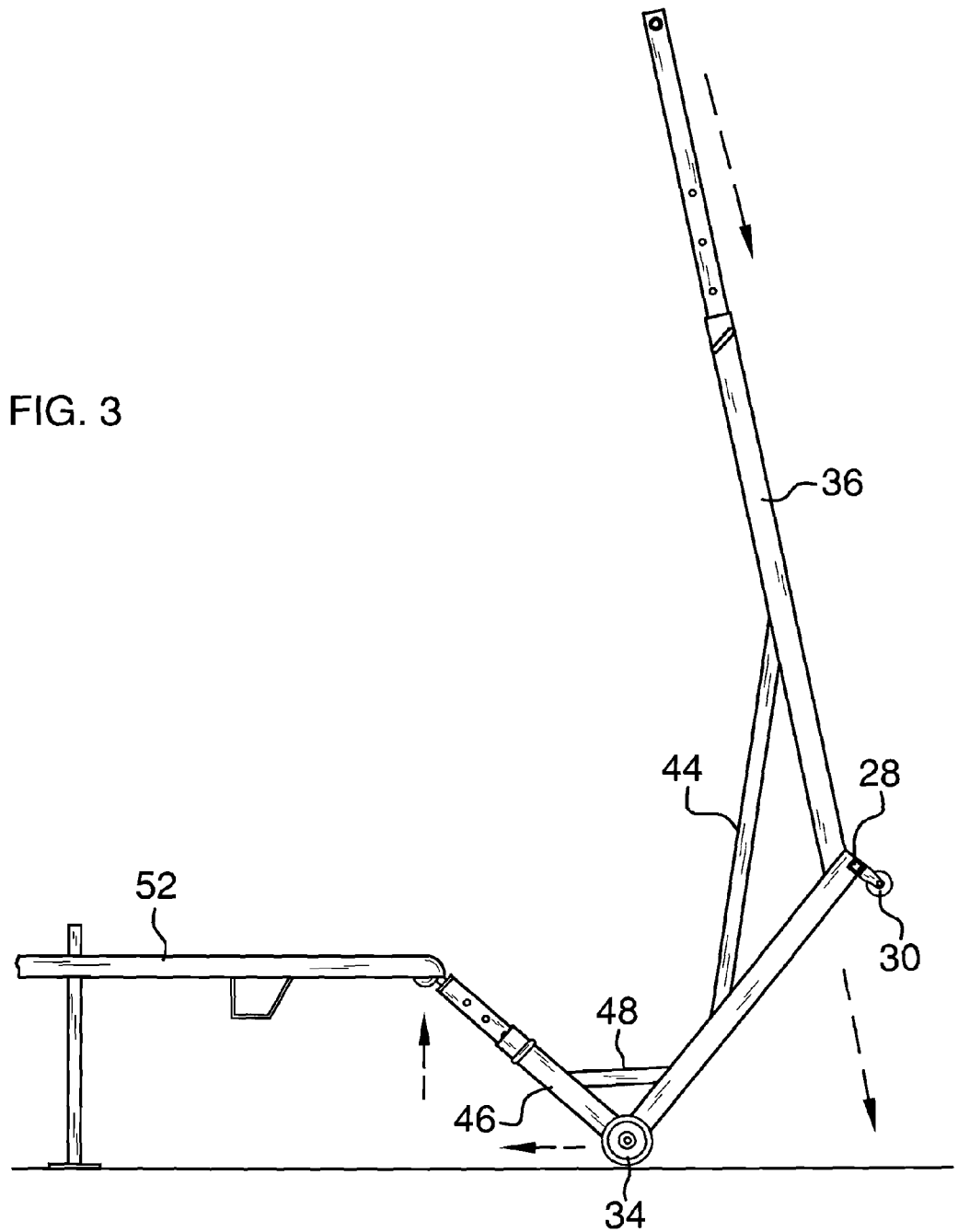
FIG. 3 is a side view of an embodiment of the disclosure.
Figure 4:
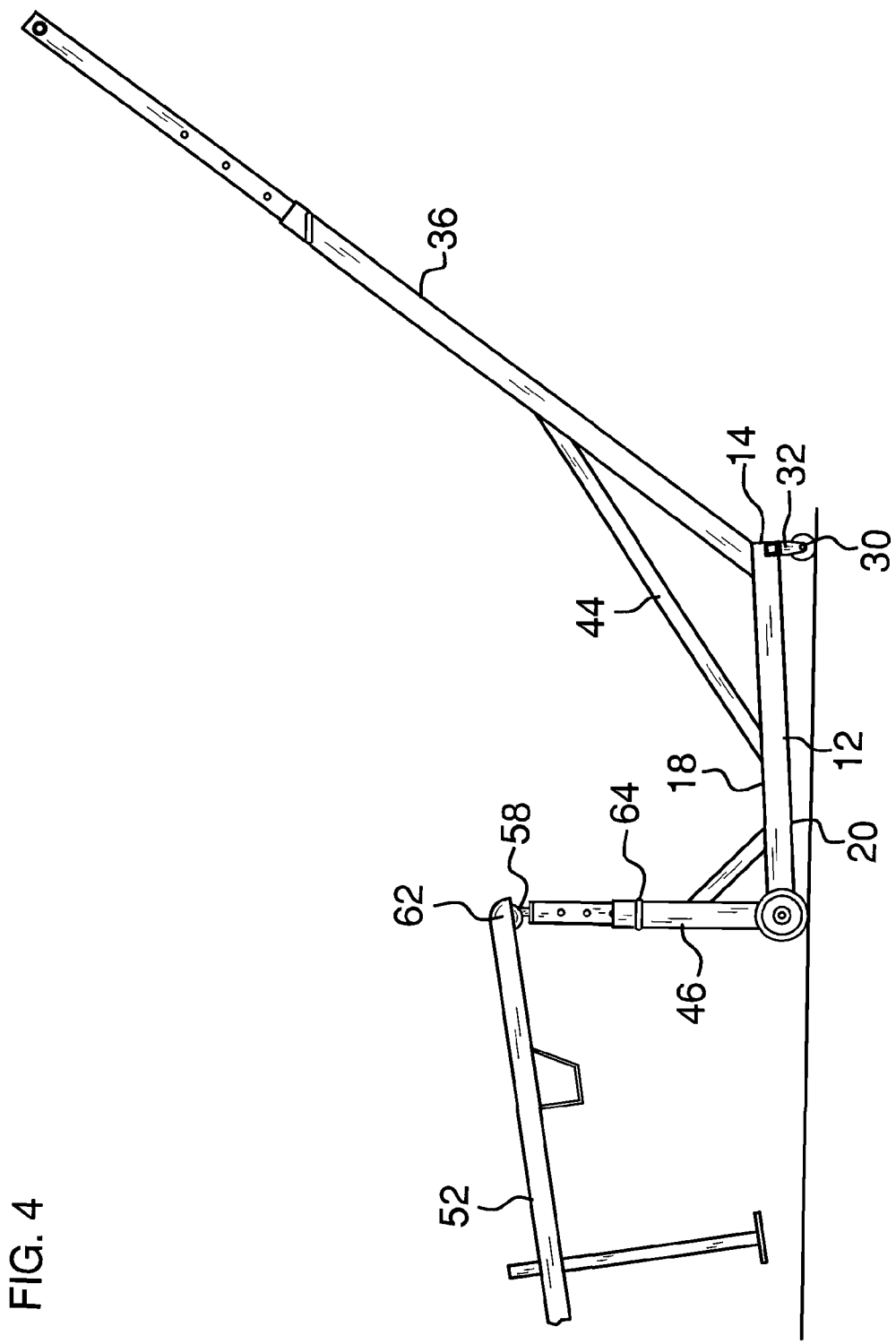
FIG. 4 is a side view of an embodiment of the disclosure.
Figure 5:
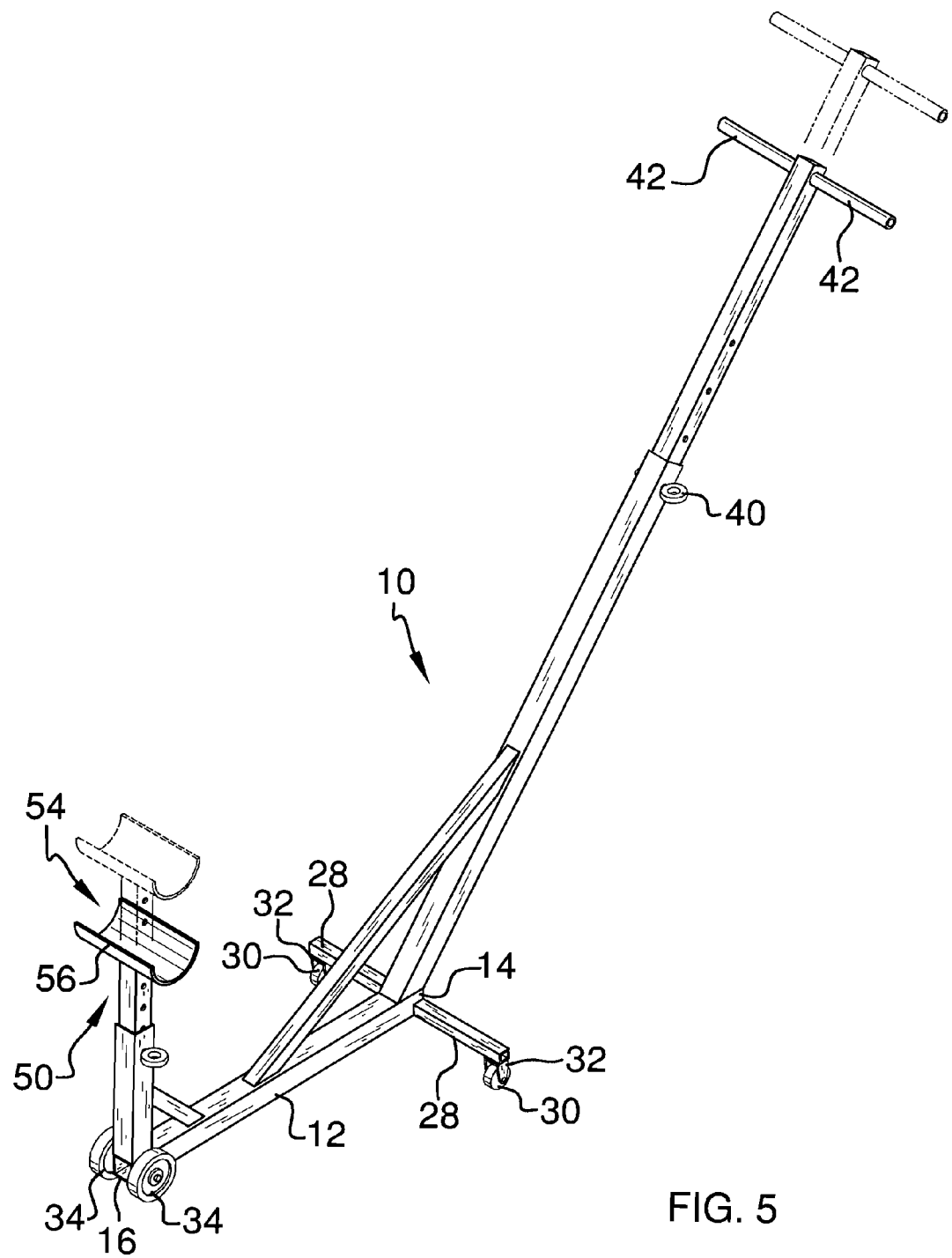
FIG. 5 is a top perspective view of an embodiment of the disclosure.
Figure 6:
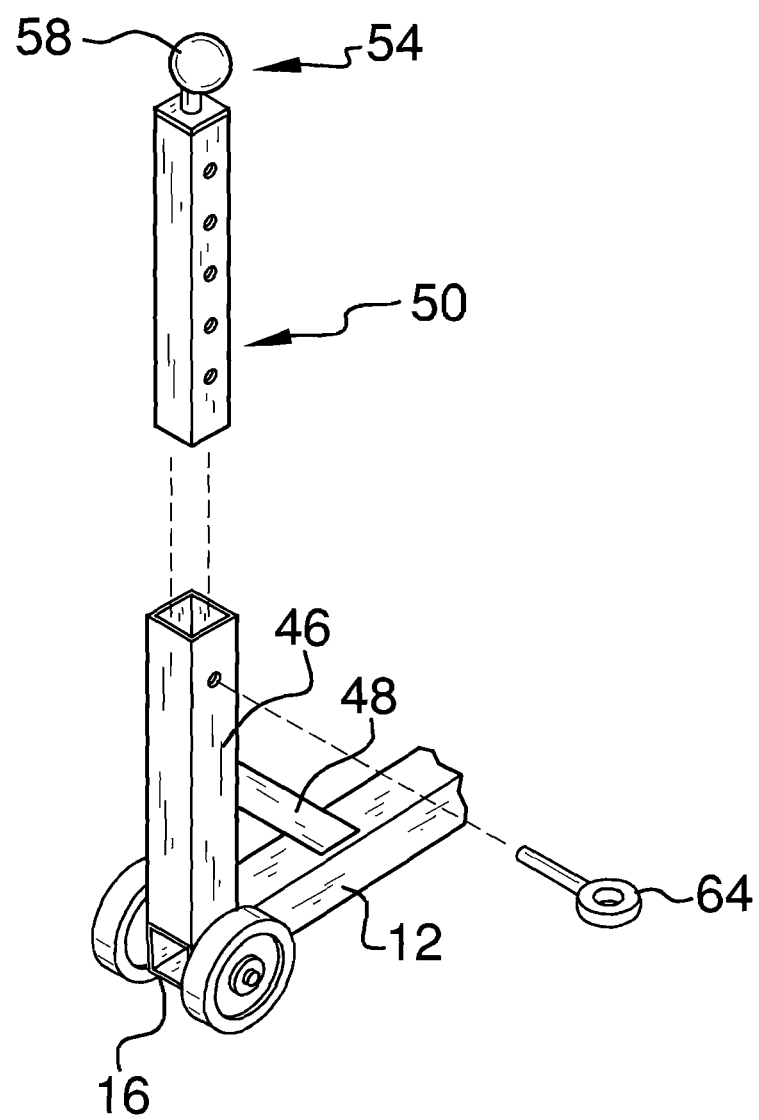
FIG. 6 is a broken perspective view of an embodiment of the disclosure.

A trailer engagement member 50 extends upwardly from the post 46 and is configured to engage a trailer 52. The trailer engagement member 50 has a top end 54 that is positionable at an adjustable height with respect to the base 12. This may be done by the trailer engagement member 50 being telescopically engaged with the post 46. The trailer engagement member 50 is secured in place with respect to the post 46 with a locking pin 64. The top end 54 may be selected from the group consisting of a saddle 56 and a male ball hitch 58. The saddle 56 may be used for simply receiving a portion of the trailer 52 as shown in FIG. 2, such as adjacent to a wheel 60 thereof, to lift the trailer 52 so that the wheel 60 changed. The ball hitch 58 may be used to engage with the female ball hitch 62 so that the front 34 and rear 30 wheels are used for moving the trailer 52.

In use, the trailer engagement member 50 is placed under the trailer 52 when the upper end 54 is lifted so that the rear wheels 30 are off of a ground surface. The upper end 38 is then lowered to engage the trailer engagement member 50 with a trailer 52 to lift the trailer 52 when the rear 30 and front 42 wheels are abutted with a ground surface. The angle of the post 46 places the center of gravity over the base 12 so that trailer 52 is stable in its lifted condition. In such a state, a wheel 60 of the trailer can easily be prepared. If the trailer engagement member 50 engages the hitch 62 of the trailer 52, the front 34 and rear 30 wheels can be used for moving the trailer 52 where needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A trailer movement and lifting assembly comprising:
   a base having a first end, a second end, an upper edge and a lower edge;
   a pair of lateral supports being attached to said base adjacent to said first end, said lateral supports extending laterally away from said base in opposite directions with respect to each other;
   a pair of rear wheels, each of said lateral supports having one of said rear wheels attached thereto, each of said rear wheels being coupled to an associated one of said lateral supports by a swivel such that axis of rotation of said rear wheels pivots with respect to said base;
   a pair of front wheels, each of said front wheels being attached to said base adjacent to said second end and being positioned on opposite sides of said base with respect to each to each other;
   a leverage bar being attached to said base adjacent to said first end and extending upwardly above said upper edge, said leverage bar having an upper end positioned opposite of said base, said leverage bar being angled away from said second end;
   a grip being attached to said leverage bar adjacent to said upper end;
   a post being attached to said base adjacent to said second end and extending upwardly therefrom, said post being angled toward said first end;
   a trailer engagement member extending upwardly from said post and being configured to engage a trailer, said trailer engagement member having a top end being positionable at an adjustable height with respect to said base; and
   wherein said upper end is lowered to engage said trailer engagement member with the trailer to lift the trailer when said rear and front wheels are abutted with a ground surface.

2. The assembly according to claim 1, wherein an angle between said upper edge and said leverage bar is between 130° and 140°.

3. The assembly according to claim 2, wherein said leverage bar is telescopic such that said a length from said upper end to said base is adjustable.

4. The assembly according to claim 3, wherein said leverage bar extends away from said base a distance of at least 48 inches.

5. The assembly according to claim 2, wherein an angle between said upper edge and said post is between 70° and 80°.

6. The assembly according to claim 1, wherein an angle between said upper edge and said post is between 70° and 80°.

7. The assembly according to claim 1, wherein said top end is selected from the group consisting of a saddle and a male ball hitch.

8. A trailer movement and lifting assembly comprising:
   a base having a first end, a second end, an upper edge and a lower edge, said base having a length from said first end to said second end between 26 inches and 38 inches;
   a pair of lateral supports being attached to said base adjacent to said first end, said lateral supports extending laterally away from said base in opposite directions with respect to each other;
   a pair of rear wheels, each of said lateral supports having one of said rear wheels attached thereto, each of said rear wheels being coupled to an associated one of said lateral supports by a swivel such that axis of rotation of said rear wheels pivots with respect to said base;
   a pair of front wheels, each of said front wheels being attached to said base adjacent to said second end and being positioned on opposite sides of said base with respect to each to each other, each of said rear wheels having an axis of rotation oriented perpendicular to a longitudinal axis of said base extending through said first and second ends;
   a leverage bar being attached to said base adjacent to said first end and extending upwardly above said upper edge, said leverage bar having an upper end positioned opposite of said base, said leverage bar being angled away from said second end of said base such that an angle between said upper edge and said leverage bar is between 130° and 140°, said leverage bar being telescopic such that said a length from said upper end to said base is adjustable, said leverage bar extending away from said base a distance of at least 48 inches;
   a grip being attached to said leverage bar adjacent to said upper end;
   a post being attached to said base adjacent to said second end and extending upwardly therefrom, said post being angled toward said first end such that an angle between said upper edge and said post is between 70° and 80°;
   a trailer engagement member extending upwardly from said post and being configured to engage a trailer, said trailer engagement member having a top end being positionable at an adjustable height with respect to said base, said top end being selected from the group consisting of a saddle and a male ball hitch; and
   wherein said upper end is lowered to engage said trailer engagement member with the trailer to lift the trailer when said rear and front wheels are abutted with a ground surface.

* * * * *